United States Patent Office 2,742,455
Patented Apr. 17, 1956

2,742,455
PRODUCTION OF N,N-POLYOXYETHYLATED ROSIN AMINES

Robert L. Sundberg, Alpha, N. J., assignor to General Aniline & Film Corporation, New York, N. Y., a corporation of Delaware No Drawing. Application September 24, 1951, Serial No. 248,089

1 Claim. (Cl. 260—102)

This invention relates to an improved process for the preparation of N,N-polyoxyethylated rosin amines by reaction of rosin amines with ethylene oxide.

Polyoxyethylated rosin amines are versatile surfactants which are useful as detergents, emulsifying agents and as textile and dye assistants. They are also especially valuable as frothing agents, drilling mud additives, for breaking oil emulsions, and as corrosion inhibitors for metals in the presence of mineral acids.

Manufacture of polyoxyethylated rosin amines is known in the art. However, the presence of unreacted rosin amine in the product has been a constant source of trouble. Thus, unreacted rosin amine in certain polyoxyethylated rosin amine products causes an undesirable turbidity in dilute aqueous solutions. Further, the presence of unreacted rosin amine in any composition to be applied to the skin is higly undesirable due to its tendency to cause irritation to the skin. It is known that reaction of rosin amines with ethylene oxide in the presence of alkaline catalysts such as sodium and potassium hydroxides, alkoxides and the like, forms products containing substantial proportions of unreacted rosin amines and wax-like polyethylene glycol ethers in addition to the desired polyoxyethylated rosin amines. Thus, a polyoxyethylated rosin amine prepared by reaction of rosin amine with 4 mols of ethylene oxide in the presence of 0.6% sodium hydroxide was found to contain 27.5% free rosin amines. Similarly, a polyoxyethylated rosin amine prepared by reacting rosin amine with 12 mols of ethylene oxide in the presence of sodium methylate was found to contain 20% unreacted rosin amines.

The amount of unreacted primary amine present can be markedly decreased by reacting the amine with large amounts of ethylene oxide. This, however, is attended by loss of surface activity due to the unfavorable hydrophobic to hydrophilic balance. It has been proposed in U. S. Patents 2,510,284 and 2,510,295 to diminish or eliminate the presence of unreacted primary amines in polyoxyethylated rosin amines by first reacting the rosin amine with one or two molecular equivalents of ethylene oxide in the presence of a volatile aliphatic alcohol. The alcohol is then removed and reaction continued with an additional amount of ethylene oxide in the presence of an alkaline catalyst.

It is an object of this invention to provide improved processes for the manufacture of polyoxyethylated rosin amines substantially free of unreacted rosin amines. Other objects and advantages will appear as the description proceeds.

These objects are attained by the instant invention which comprises causing a rosin amine to react with ethylene oxide in the absence of either catalysts or solvents in order to produce an N,N-polyoxyethylated rosin amine. Polyoxyethylated rosin amines increase in water-solubility as the number of oxyethyl groups is increased, and accordingly, if the water-solubility and surface activity of the product must be increased, the product of the aforementioned process is then caused to react with an additional amount of ethylene oxide in the presence of an alkaline catalyst. The product of the initial step of the process( and, consequently, also the product of the second step of the process) contains substantially no unreacted primary rosin amines.

The instant invention eliminates the necessity for using a volatile aliphatic alcohol in the reaction between the rosin amine and the ethylene oxide and its attendant disadvantages. Such disadvantages reside in the fact that care must be taken to use anhydrous alcohol because of the reaction of water with ethylene oxide to produce polyethylene glycol. Still more important is the necessity for complete removal of the aliphatic alcohol before further condensation with ethylene oxide in the presence of a catalyst since ethylene oxide reacts with aliphatic alcohols readily in the presence of an alkaline catalyst, thereby producing undesirable by-products, etc. The use of a volatile alcohol may be attended by serious explosive and health hazards, while its removal preparatory to the second stage of the process is an expensive and time-consuming operation.

In the initial reaction between the rosin amine, and the ethylene oxide in the absence of catalysts and solvents, there is usually employed 2 to 5 moles of ethylene oxide per mole of rosin amine. In carrying out the initial stage of the process we prefer to utilize temperatures which may range from 60 to 200° C., and most preferably from about 100 to 150° C. While the initial stage may be conducted under atmospheric pressure it is preferable to conduct the process under superatmospheric pressures of ethylene oxide which may range up to 150 p. s. i. or more, although pressures of about 10 to 35 p. s. i. are preferred. An inert gas diluent such as nitrogen may be used, with suitable changes in pressure, in which event the completion of the reaction is readily determined by observation of a decrease in pressure. It will of course be obvious that the temperature, pressure, duration of treatment, etc. in any particular case will be somewhat interdependent, but care should be taken in this initial stage not to employ conditions so drastic that an unduly rapid reaction takes place whereby a product containing unreacted rosin amines would be obtained. In general, only a limited amount of ethoxy groups can be introduced into the rosin amine in the initial stage, so that completion of the treatment will usually be indicated by a substantial drop (in some cases to zero) in the rate of absorption of the ethylene oxide.

In the second stage of the process an alkaline catalyst is used to promote the reaction between the additional ethylene oxide and the polyoxyethylated rosin amine produced in the initial stage. While sodium hydroxide, potassium hydroxide and sodium methylate are the preferred catalysts, other catalysts may be employed, such as sodium and potassium acetates, carbonates and alkoxides, tertiary amines, quaternary ammonium hydroxides, and the like. Usually about .2 to 5% of catalyst, based on the weight of the rosin amine, is employed. Since all the starting rosin amine was reacted in the initial stage, conditions favoring a higher rate of reaction may be used in the second stage. Accordingly, temperatures and pressures similar to or slightly higher than those employed in the initial stage may be employed in the second stage of the process, wherein up to about 35 additional ethoxy groups may be incorporated into the product by reaction with the corresponding number of moles of ethylene oxide. Thus, pressures of about 20 to 50 p. s. i. are preferred for the second stage.

The N,N-polyoxyethylated rosin amines produced by the invention in accordance with the above-described process will contain 2 to about 40 ethoxy groups. The products of the initial stage of the process have utility as drilling mud additives, corrosion inhibitors in pickling baths and acid cleaning solutions, and the like. Compositions in which the number of ethoxy groups is near the lower end of the specified range are somewhat oil-soluble as well as somewhat water-soluble, the water-solubility increasing as the upper end of the range is approached. Those products containing 8 to 30 ethoxy groups have outstanding detergent properties in washing cellulosic materials such as cotton. For general utility as detergents those products having 8 to 15 ethoxy groups are preferred. Products having 2 to 30 ethoxy groups are soluble in aqueous hydrochloric acid and are effective as inhibitors in the pickling of ferrous metals and the like. For the latter purpose products having 16 to 30 ethoxy groups are generally preferred. Products having 30 to 40 ethoxy groups are valuable as emulsion breakers in petroleum refining and the like.

The term "rosin amine" as employed in the specification and claims is intended to include the primary amines derived from various rosins or rosin acids in which the carboxyl is substituted by a —$CH_2NH_2$ group, and generally include abietyl amine, dehydroabietyl amine, dihydroabietyl amine, tetrahydroabietyl amine, and the like.

The following examples are illustrative of the invention and are not to be regarded as limitative:

Example 1

317 g. Rosin Amine D (a mixture of primary amines derived from a mixture of dehydroabietic, dihydroabietic and tetrahydroabietic acids) were treated by slowly adding excess ethylene oxide gas at 25–33 pounds p. s. i. and at a reaction temperature of 150° C. until substantially no more ethylene oxide was absorbed. 104 g. ethylene oxide were absorbed over a period of six hours.

The product was amber-colored and very viscous. Analysis showed substantially no primary or secondary amines to be present. The neutral equivalent was 409 (calculated value=420.9 if the neutral equivalent of the starting amine is assumed to be 317). The calculated mol ratio of ethylene oxide to rosin amines was 2.36.

Example 2

321 g. Rosin Amine D were treated as in Example 1 by slow addition of excess ethylene oxide gas at 130° C. at 25–33 pounds p. s. i. for about seven hours. 127.5 g. ethylene oxide reacted. The amber-colored viscous product contained substantially no primary or secondary amines and had a neutral equivalent of 437 (calculated value 442.8 based on a neutral equivalent of 317 for the starting amines). The calculated mol ratio of ethylene oxide to rosin amines was 2.86.

Example 3

319 g. Rosin Amine D were treated as in Example 1 by slow addition of excess ethylene oxide gas at 110° C. and 25–30 pounds p. s. i. over a period of 6¾ hours. 164 g. ethylene oxide reacted. Analysis of the amber-colored viscous product showed substantially no free primary amines or secondary amines and the neutral equivalent was 458 (calculated value=480.8 based on a neutral equivalent of 317 for the starting Rosin Amine D). The calculated mol ratio of ethylene oxide to rosin amines was 3.7.

Example 4

317 g. Rosin Amine D were treated with 92 g. ethylene oxide at 110° C. by the slow addition of the ethylene oxide at a pressure of thirty pounds p. s. i. over a period of 4½ hours. At the end of this period, the presure dropped to about five pounds p. s. i., indicating completion of the reaction. A small sample of product was removed from the autoclave. There was less than 1% primary amine and less than 3% secondary amine present (assuming molecular weights of 317 and 361 respectively for primary and secondary amine). The calculated mol ratio of ethylene oxide to rosin amines was 2.1, assuming a molecular weight of 317 for the primary amine.

To the autoclave were added 1.24 g. NaOH. 704 g. ethylene oxide were slowly added at 30 pounds p. s. i. over a period of 8½ hours while keeping the reaction temperature at 110° C. At the end of this period, the pressure drop indicated completion of the reaction. The product was an amber-colored semi-solid that dissolved in water to a sparkling clear solution in all proportions. The calculated mol ratio of ethylene oxide to rosin amines was 19.0. This product was a highly efficient pickling inhibitor for steel in strong mineral acid.

The procedure employed for determining neutral equivalents, primary, secondary and tertiary amines in the above examples is set forth in articles by Siggia et al. in "Analytical Chemistry," volume 22, pages 1295–1297, October 1950, and volume 23, pages 117, 118, January 1951.

Various modifications and variations of this invention will be obvious to a person skilled in the art, and such variations and modifications are to be regarded as within the purview of this application and the spirit and scope of the appended claim.

What is claimed is:

A method of producing an N,N-polyoxyethylated rosin amine substantially free of primary and secondary rosin amines which comprises causing one mole of a rosin amine to react with 2 to 5 moles of ethylene oxide in the absence of catalysts and solvents at a temperature of about 100 to 150° C. and at super-atmospheric pressure and then causing the resulting reaction product to react with up to 35 moles of ethylene oxide in the presence of an alkaline catalyst at a temperature of about 60 to 200° C. and at super-atmospheric pressure.

References Cited in the file of this patent

UNITED STATES PATENTS

| | | |
|---|---|---|
| 2,510,284 | Haggard | June 6, 1950 |
| 2,510,295 | Rosher | June 6, 1950 |
| 2,586,767 | Wilson | Feb. 19, 1952 |

FOREIGN PATENTS

| | | |
|---|---|---|
| 467,571 | Great Britain | June 16, 1937 |